US009408180B2

(12) United States Patent
Karimli et al.

(10) Patent No.: US 9,408,180 B2
(45) Date of Patent: Aug. 2, 2016

(54) TRAFFIC MANAGEMENT FOR HETEROGENOUS NETWORKS

(71) Applicant: T-Mobile USA Inc., Bellevue, WA (US)

(72) Inventors: Yasmin Karimli, Kirkland, WA (US); Anthony J. Silveira, Downers Grove, IL (US); Brian A. Olsen, Bellevue, WA (US); Neng-Tsann Ueng, Bellevue, WA (US)

(73) Assignee: T-MOBILE USA, INC., Bellevue, WA (US)

( * ) Notice: Subject to any disclaimer, the term of this patent is extended or adjusted under 35 U.S.C. 154(b) by 0 days.

(21) Appl. No.: 14/198,244

(22) Filed: Mar. 5, 2014

(65) Prior Publication Data
US 2015/0257124 A1    Sep. 10, 2015

(51) Int. Cl.
*H04W 36/00* (2009.01)
*H04W 64/00* (2009.01)
*H04W 48/16* (2009.01)
*H04W 36/32* (2009.01)
*H04W 48/20* (2009.01)

(52) U.S. Cl.
CPC ........ *H04W 64/006* (2013.01); *H04W 36/0083* (2013.01); *H04W 48/16* (2013.01); *H04W 36/32* (2013.01); *H04W 48/20* (2013.01)

(58) Field of Classification Search
CPC . H04W 36/00; H04W 36/0061; H04W 36/32; H04W 36/08; H04J 11/00
USPC ...................... 455/436, 438, 456.1
See application file for complete search history.

(56) References Cited

U.S. PATENT DOCUMENTS

| 5,678,184 | A | * | 10/1997 | Cutler et al. ................. 455/436 |
| 6,167,283 | A | | 12/2000 | Korpela et al. |
| 7,171,216 | B1 | * | 1/2007 | Choksi ...................... 455/456.1 |
| 7,602,722 | B2 | | 10/2009 | Chheda |
| 8,131,300 | B2 | | 3/2012 | Sartori et al. |
| 8,380,200 | B1 | * | 2/2013 | Spitzer et al. ................ 455/436 |
| 8,433,320 | B2 | * | 4/2013 | Gresset et al. ............... 455/436 |
| 8,954,079 | B2 | * | 2/2015 | Yi et al. ....................... 455/444 |
| 2004/0240415 | A1 | | 12/2004 | Lane |
| 2007/0191013 | A1 | * | 8/2007 | Gunnarsson et al. ......... 455/438 |

(Continued)

FOREIGN PATENT DOCUMENTS

| EP | 1022918 A2 | 7/2000 |
| WO | WO 2010 049243 | 5/2010 |
| WO | WO 2013 025158 | 2/2013 |

OTHER PUBLICATIONS

Atallah, "Mobile and Wireless Network Architectures Project Report", http://www.ict.kth.se/courses/IK2555/2G1330/Jad_Atallah_report_revised_20040625.pdf, May 24, 2004.

*Primary Examiner* — William Nealon
(74) *Attorney, Agent, or Firm* — Knobbe, Martens, Olson & Bear, LLP

(57) ABSTRACT

This disclosure relates to cell selection of a telecommunication device based on mobility management algorithms for idle mode cell selection routines and handover routines. The mobility management algorithm can utilize the BTS class of the infrastructure equipment to help determine cell selection. The BTS class of the infrastructure equipment can be used to determine the geographic size of the coverage area that the infrastructure equipment provides. These algorithms can be used to help handle mobility management for telecommunication device.

33 Claims, 9 Drawing Sheets

(56) References Cited

U.S. PATENT DOCUMENTS

| | | |
|---|---|---|
| 2008/0188215 A1 | 8/2008 | Bergstrom et al. |
| 2010/0069119 A1* | 3/2010 | Mueck ............... H04J 11/0069 455/561 |
| 2011/0039520 A1* | 2/2011 | Maida ............... H04W 36/0083 455/411 |
| 2011/0117917 A1* | 5/2011 | Gresset et al. ............... 455/436 |
| 2011/0281590 A1 | 11/2011 | Frederiksen et al. |
| 2012/0034947 A1 | 2/2012 | Hosono et al. |
| 2012/0258750 A1 | 10/2012 | Kim et al. |
| 2012/0282864 A1 | 11/2012 | Dimou et al. |
| 2013/0005344 A1* | 1/2013 | Dimou et al. ............... 455/441 |
| 2013/0028129 A1 | 1/2013 | Chun et al. |
| 2013/0150056 A1* | 6/2013 | Yi et al. ............... 455/444 |
| 2014/0120955 A1* | 5/2014 | Padden et al. ............... 455/456.6 |
| 2015/0257050 A1 | 9/2015 | Karimli et al. |

\* cited by examiner

TRAFFIC MANAGEMENT FOR HETEROGENOUS NETWORKS

BACKGROUND

A cellular communication network is typically formed between a plurality of mobile devices, often referred to user equipment ("UE"), and a network of stationary infrastructure equipment, often referred to as "base stations" or "node Bs". Generally described, a mobile services provider will distribute individual infrastructure equipment throughout a geographic area such that coverage areas of the individual infrastructure equipment overlap. A telecommunication device within the coverage area of one or more infrastructure equipment can communicate over the cellular communication network.

Telecommunication devices are typically configured to connect to a specific infrastructure equipment within a mobile network. For example, when a telecommunication device is activated or turned on, it attempts to connect to infrastructure equipment and register to the location area of the infrastructure equipment. Registering informs the mobile telephone network that the telecommunication device can be paged through the location area of the infrastructure equipment. In idle mode the telecommunication device regularly receives messages sent by the infrastructure equipment in order to detect paging messages indicating incoming calls and other messages. If the telecommunications device receives signals from multiple infrastructure equipment, the telecommunications device can select infrastructure equipment based on signal strength.

In many instances, users of telecommunications equipment are mobile. As such, the signal strength received by a telecommunications device may vary greatly depending on factors, such as rate of movement, geographic barriers, etc. Because most communication networks can provide overlapping coverage areas for the infrastructure structure equipment, most wireless communication protocols facilitate a handover procedure in which a telecommunications device is capable of connecting to different infrastructure equipment without losing an existing communication channel/connection.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Figure 1:
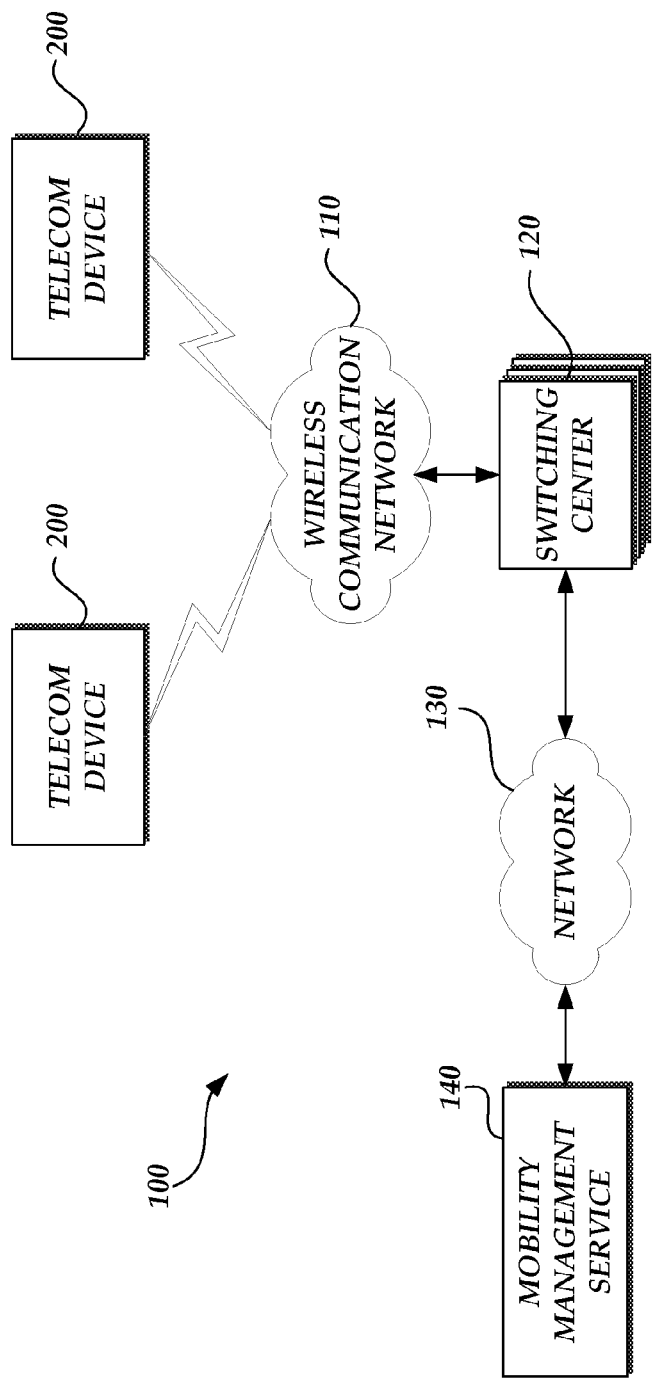
FIG. 1 is a block diagram depicting an illustrative telecommunication environment.

Generally described the present disclosure relates to cell selection for telecommunication devices. More specifically, aspects of the present application correspond to the utilization of mobility management algorithms in telecommunication networks. Illustratively, the mobility management algorithms can utilize infrastructure equipment classifications provided in communication protocols to help determine cell selection in idle mode cell selection routines and handover routines.

In a wireless communication network, infrastructure equipment may be configured such that the coverage area for different types of infrastructure equipment can vary. The size of the coverage area can also be referred to as cell size. When the coverage area of infrastructure equipment overlap, it may be possible for a telecommunication device to attempt to establish a communication channel to any of the available infrastructure equipment. In conjunction with establishing or maintaining a communication channel, the infrastructure equipment in a mobile device network can identify characteristics of its respective coverage area to the telecommunications device. As will be described in greater detail below, one such characteristic can correspond to an identification of a class of infrastructure equipment, which can be referred to as BTS class.

A telecommunication device has at least two modes of operation with relation to establishing or maintaining a communication channel with infrastructure equipment. In a first mode, an idle or reselect mode, the telecommunication device can select from among infrastructure equipment to establish a communication channel. In embodiments in which two or more infrastructure equipment may have overlapping coverage areas relative to a particular telecommunication device, the telecommunication device can select or prioritize from available infrastructure equipment based on implementing a mobility management algorithm.

Illustratively, the mobility management algorithm can select or prioritize infrastructure equipment based, at least in part, on the size of the coverage area associated with the infrastructure equipment, which may be generally referred to as the size of the infrastructure equipment The size of the coverage area can be defined to the telecommunications device based on a BTS class associated with the infrastructure equipment that is transmitted to the telecommunications device. More specifically, in one embodiment, BTS class identifiers can be defined in terms of a set of identifiers that correspond to the various BTS classes of infrastructure equipment, such as a set of identifiers that approximate geographic coverage area of the infrastructure equipment.

In some embodiments, a mobility management algorithm can associate weighted values with one or more of the BTS class identifiers received from the infrastructure equipment. More specifically, in one example, a mobility management algorithm can utilize weighted values to influence or bias selection of infrastructure equipment associated with a specific BTS class identifier. In another example, the mobility management algorithm can utilize weighted values to create a general bias related to general properties associated with multiple BTS class identifiers. In accordance with this example, an illustrative mobility management algorithm can utilize weighted values that will influence the selection of infrastructure equipment associated with a number of BTS class identifiers for smaller cells rather than BTS identifiers associated with larger cells. In a further example, the mobility management algorithm can dynamically weight values associated with BTS class identifiers based on movement speed of the telecommunication device. In accordance with this example, the mobility management algorithm can adjust a weighted value for a larger cell if a movement speed associated with a telecommunication device exceeds a threshold. In still further embodiment, the mobility management algorithm can determine selection of infrastructure equipment based on BTS class identifiers and other criteria, such as signal strength, signal quality, data rate, the number of connected users and other quality of service indicators.

In a second mode with relation to establishing or maintaining a communication channel with infrastructure equipment, the telecommunication device can be in an active or connected mode when the telecommunication device has an active communication channel with the wireless communication network, such as during a voice call or data session. Illustratively, even though a telecommunication device has at least one active communication channel, the telecommunication device may be configured to establish an additional communication channel and cause a transition from the previously existing communication channel to the current communication channel, generally referred to as a handover.

In a connected mode, a mobility management service can identify infrastructure equipment for handover after a handover request has been determined. The mobility management service can select the infrastructure equipment, based at least in part, on the BTS class of the infrastructure equipment. The BTS class information can be provided by a BTS class identifier associated with each infrastructure equipment. In a manner similarly discussed with regard to an idle or reselect mode, the mobility management service can associate weighted values to BTS class identifiers. The BTS class identifier is one of a plurality of handover criteria used by the mobility management algorithm to determine handover from one infrastructure equipment to another. For example, the weighted values of the BTS class identifiers can be used to create a bias for specific classes of cells, or a general bias for smaller or larger cells. The mobility management algorithm can process the BTS class and the various handover criteria, such as signal quality, and other quality of service criteria, in order to select an infrastructure equipment for handover.

Although aspects of the present disclosure will be described with regard to an illustrative telecommunication environment and component interactions, communication protocols, flow diagrams and user interfaces, one skilled in the relevant art will appreciate that the disclosed embodiments are illustrative in nature and should not be construed as limiting. Specifically, although the term telecommunication device is used in this document, the term represents any type of device having a component for communicating with one or more other devices via one or more communication paths. Such communication paths can include wireless communication paths (via infra-red, RF, optical, terrestrial, or satellite communication media) and wired communication paths. Additionally, although the present disclosure references a telecommunication device, one skilled in the relevant art will appreciate that a telecommunication device may also be referred to as a wireless computing device, a mobile communication device, or a computing device. Examples of telecommunication networks and devices are described below. Accordingly, reference to a telecommunication device should not be interpreted as including any particular functionality or operation not described in the present disclosure. Still further, although the present disclosure is described with regard to specific methodologies and frameworks for distributing authentication sessions, the present disclosure should not be construed to require combination of the disclosed embodiments or any specific variation unless such combination or variation is expressly identified.

With reference now to FIG. 1, a block diagram illustrative of a telecommunication environment 100 will be described. The telecommunication environment 100 can include a mobility management service 140. In an illustrative embodiment, the mobility management service 140 may be utilized to implement one or more mobility management algorithms to perform infrastructure equipment handover management routines.

While the mobility management service 140 is depicted in FIG. 1 as corresponding to a single computing device in the telecommunication device communication environment 100, this is illustrative only. The mobility management service 140 may be embodied in a plurality of computing devices, each executing an instance of the mobility management service. A server or other computing device may include memory, processing unit(s), and computer readable medium drive(s), all of which may communicate with one another by way of a communication bus. The network interface may provide connectivity over the network 130 and/or other networks or computer systems. The processing unit(s) may communicate to and from memory containing program instructions that the processing unit(s) executes in order to operate the mobility management service 140. The memory generally includes RAM, ROM, and/or other persistent and auxiliary memory. With continued reference to FIG. 1, the telecommunication environment 100 can include a number of telecommunication devices 200, each associated with a user. The telecommunication devices 200 can correspond to a wide variety of devices or components that are capable of initiating, receiving or facilitating communications over a communication network including, but not limited to, personal computing devices, electronic book readers (e.g., e-book readers), hand held computing devices, integrated components for inclusion in computing devices, home electronics, appliances, vehicles, machinery, landline telephones, network-based telephones (e.g., voice over IP ("VoIP"), cordless telephones, cellular telephones, smart phones, modems, personal digital assistants, laptop computers, gaming devices, media devices, and the like. In an illustrative embodiment, the telecommunication devices 200 include a wide variety of software and hardware components for establishing communications over one or more communication networks, including wireless communication network 110, a wired communication network (not shown), or an IP-based telecommunication network (not shown). Illustrative components of a telecommunication device 200 will be described in greater detail with regard to FIG. 2.

In an illustrative embodiment, the telecommunication device communication environment 100 can include a number of additional components, systems and/or subsystems for facilitating communications with the telecommunication devices 200, and/or the mobility management service 140. The additional components can include one or more switching centers 120 for establishing communications with the telecommunication devices 200 via the wireless communication network 110, such as a cellular radio access network incorporating one or more wireless air interface standards promulgated by a standards organization, such as air interface protocols based on code division multiplex access (CDMA), time division multiple access (UEMA), global system for mobile communications (GSM), wireband code division multiplex access (WCDMA), code division multiplex access $3^{rd}$ generation (CDMA2000), time division synchronous code division multiple access (UE-SCDMA), wavelength and time division multiple access (WUEMA), long term evolution (LTE), orthogonal frequency division multiple access (OFDMA), and similar technologies). Additionally, a wireless network based on the family of IEEE 802.11 technical standards ("WiFi"), a wireless network based on IEEE 802.16 standards ("WiMax"), a converged wireless telecommunication network such as Unlicensed Mobile Access ("UMA"), or General Access Network ("GAN"), and other wireless networks. The operation of mobile communication networks, such as wireless communication network 110 are well known and will not be described in greater detail.

As illustrated in FIG. 1, the switching center 120 includes interfaces for establishing various communications via a communication network 130, such as the Internet, intranets, private networks and point to point networks, generally referred to as the "network." Although the wireless communication network 110 is illustrated as a single communication network, one skilled in the relevant art will appreciate that the communication network can be made up of any number of public or private communication networks and/or network connections. For example, the wireless communication network 110 can comprise a cellular network of infrastructure equipment, each having a defined coverage area. A telecommunication device 200 within a coverage area can connect to the infrastructure equipment and communicate over the wireless communication network 110 in accordance with any one of a number of wireless telecommunication interfaces.

Figure 2:
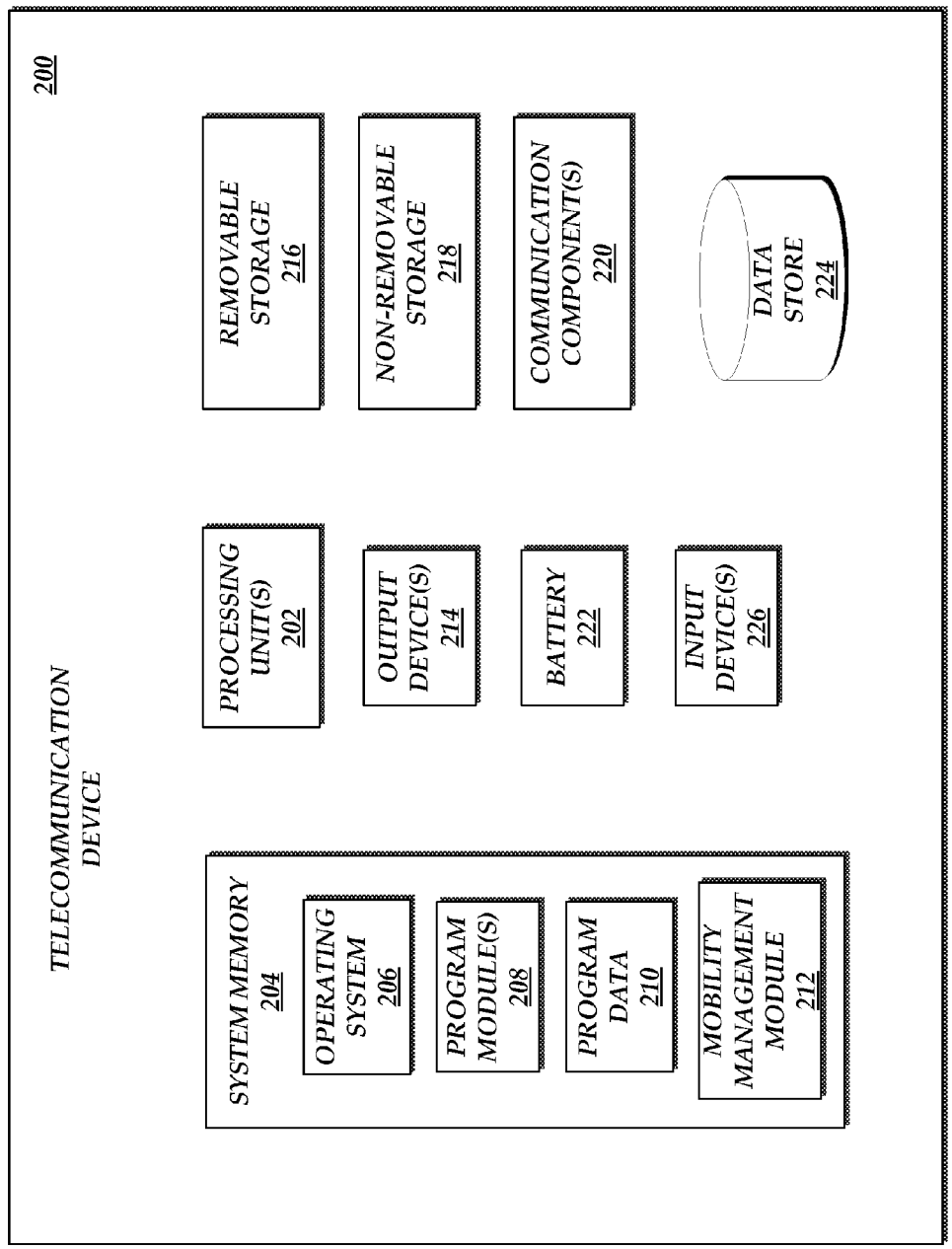
FIG. 2 is a block diagram depicting illustrative components of a telecommunications device.

FIG. 2 illustrates components of a telecommunication device 200, such as a mobile telephone. The telecommunication device 200 may include one or more processing units 202, such as one or more CPUs. The telecommunications device 200 may also include system memory 204, which may correspond to any combination of volatile and/or non-volatile computer-readable storage media. The system memory 204 may store information which provides an operating system module 206, various program modules 208, such as a mobility management module 212, program data 210, and other modules. The mobility management module 212 can be configured to process mobility management algorithms to select infrastructure equipment in an idle mode. The mobility management module 212 can utilize information such BTS class identifiers, movement speed of the telecommunication device, user preferences, and other information to process the mobility management algorithms. The above-enumerated list of components is representative and is not exhaustive of the types of functions performed, or components implemented, by the telecommunication device 200. One skilled in the relevant art will appreciate that additional or alternative components may also be included in the telecommunication device 200 to carry out other intended functions such as mobile telephone functions.

The telecommunications device 200 performs functions by using the processing unit(s) 202 to execute modules stored in the system memory 204. The telecommunications device 200 may also include one or more input devices 226 (keyboard, mouse device, specialized selection keys, etc.) and one or more output devices 214 (displays, printers, audio output mechanisms, etc.). One skilled in the relevant art will appreciate that additional or alternative software modules and/or hardware components may also be included in the telecommunications device 200 to carry out other intended functions such as mobile telephone functions.

With continued reference to FIG. 2, the telecommunications device 200 may also include a battery 222, one or more types of removable storage 216, and one or more types of non-removable storage 218. In some embodiments the device can be connected to an external power source, such as an AC power outlet. Still further, the telecommunications device 200 can include communication components 220, such as a cellular transceiver and a wireless transceiver, for facilitating communication via wired and wireless communication networks. As described above, the transceivers facilitate such communication using various communication protocols including, but not limited to, Bluetooth, the family of IEEE 802.11 technical standards ("WiFi"), the IEEE 802.16 standards ("WiMax), short message service ("SMS"), voice over IP ("VoIP") as well as various generation cellular air interface protocols (including, but not limited to, air interface protocols based on code division multiplex access (CDMA), time division multiple access (UEMA), global system for mobile communications (GSM), wireband code division multiplex access (WCDMA), code division multiplex access $3^{rd}$ generation (CDMA2000), time division synchronous code division multiple access (UE-SCDMA), wavelength and time division multiple access (WUEMA), long term evolution (LTE), orthogonal frequency division multiple access (OFDMA), and similar technologies).

Figure 3:
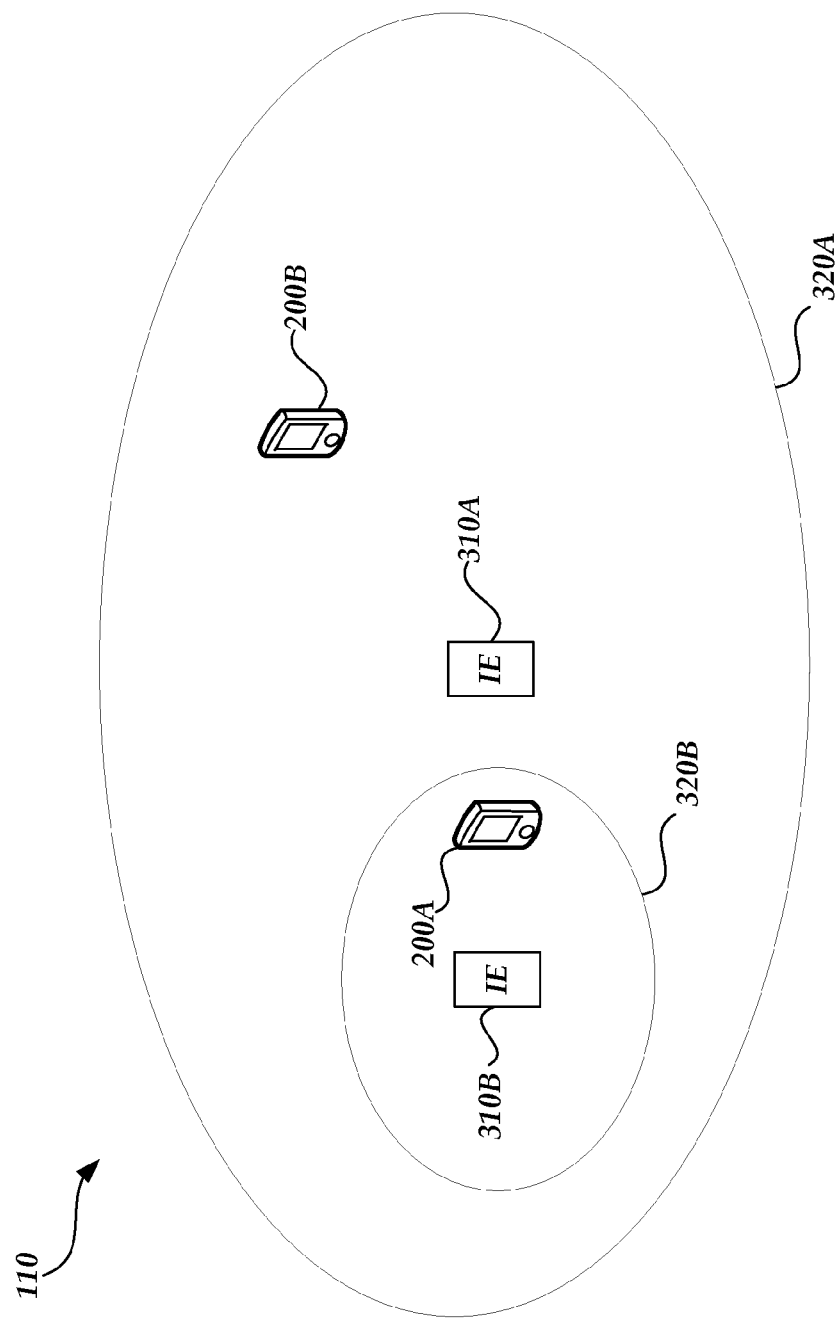
FIG. 3 is an illustrative diagram depicting infrastructure equipment in an illustrative telecommunications environment.

FIG. 3 is an illustrative example of a wireless communication network 110 comprising a heterogeneous cellular network of infrastructure equipment 310. As previously discussed, infrastructure equipment can be associated with a defined coverage area 320. The coverage area may be based on measured or detected coverage areas based on the placement of the infrastructure equipment within the wireless communication network 110. In other embodiments, the coverage areas associated with infrastructure equipment 310 may be manually assigned by the wireless communication network service provider, such as by manufacturer, type, and the like. The infrastructure equipment 310 is configured to provide communication to a plurality of telecommunication device 200 in the wireless communication network 110. The coverage area 320A is associated with infrastructure equipment 310A. The coverage area 320B is associated with infrastructure equipment 310B. The coverage area 320A overlaps with the coverage area 320B. A telecommunication device 200 positioned within a coverage area 320 can communicate through the wireless communication network 110. A telecommunication device 200 positioned in coverage area 320B can communicate with infrastructure equipment 310A or infrastructure equipment 310B.

Infrastructure equipment 310 may correspond to a fixed station, which may be referred to as a base station, an access point, a Node B, eNode B, or other type of infrastructure equipment, depending on the nomenclature and implementation of various air interface standards. Accordingly, reference to the terms infrastructure equipment, base station, cell, Node B, eNode B and the like should not be interpreted as necessarily limited to implementation with a particular air interface standard. The infrastructure equipment 310 can be classified according to the cell size. For example, in one embodiment, cell size may be characterized as femto-cell, pico-cell, micro-cell, macro-cell and mega-cell classes. In accordance with this example, macro-cells may be associated with coverage areas measured by tens of miles and micro-cells may be associated with coverage areas measured by miles. Additionally, pico-cells and femto-cells, often referred to interchangeably as small cells, can provide smaller coverage areas than micro-cells, such as hundreds of meters for pico-cells and meters for femto-cells. Still further, Mega-cells can be satellite-based networks with coverage areas measured in hundreds of miles.

Illustratively, cell size can also be characterized or communicated by association with by a BTS class. BTS class information can correspond to a standardized set of identifiers that can be used to identify an approximate geographic coverage area of infrastructure equipment 310. In one embodiment, the coverage area of the infrastructure equipment 310 can vary based on the size and power of the infrastructure equipment. The BTS class information or cell size can be communicated to the telecommunication device using a BTS class identifier. The BTS class identifier can be sent from the infrastructure equipment to the telecommunication device. The BTS class identifiers can be used to further differentiate and more accurately reflect the geographic coverage area associated with the infrastructure equipment or to otherwise facilitate the consideration of different criteria in the selection of infrastructure equipment. For example, the BTS class identifier could be subdivided into sixteen categories, rather than five, ranging from smallest to largest geographic coverage areas. The number or definitions of the BTS class identifiers is not restricted.

In addition to geographic coverage area, infrastructure equipment 310 can also be associated with one or more operational characteristics. Operational characteristics of the infrastructure equipment may include power level, bit rate, signal quality, signal strength, number of connected telecommunication device, and other operational characteristics. In some embodiments, BTS class identifiers can be configured to convey information about the coverage area of the infrastructure equipment as well as additional information about the infrastructure equipment. For example the BTS class identifier could provide a bit rate associated with the infrastructure equipment. In another example, a BTS class identifier could provide financial cost information associated with utilization of the infrastructure equipment. In still other embodiments, two or more BTS class identifiers can be utilized to refine or distinguish infrastructure equipment that may have been associated with a more coarse coverage area descriptor. For example, two or more infrastructure equipment that would be considered "pico-cells" may be characterized into one of a number of BTS class identifiers.

In an idle mode, a telecommunication device 200 can attempt to connect to an infrastructure equipment to register to the location area (LA) of the infrastructure equipment. Registering informs the wireless communication network that the telecommunication device 200 can be reached through the location area of the infrastructure equipment. In idle mode the telecommunication device 200 can regularly receive messages sent by the infrastructure equipment, such as paging messages indicating incoming calls and other messages. The telecommunication device can also determine the availability and power of signals of other nearby infrastructure equipment.

Infrastructure equipment can transmit control messages at regular intervals that are directed to all telecommunication devices within the coverage area. The control messages can include information about the base station and its operation. The control message can convey information, such as a BTS class identifier, bit rate provided by the infrastructure equipment, and other factors defining the power and capacity of the base station.

In embodiments in which a telecommunication device is geographically in overlapping coverage areas of two or more infrastructure equipment, a telecommunication device can select or prioritize infrastructure equipment based on a mobility management algorithm. The mobility management algorithm can be used to determine infrastructure equipment selection based, at least in part, on the BTS class identifier. For example, macro-class infrastructure equipment can have different data rates associated with different infrastructure equipment so there may be variation between different macro-class infrastructure equipment. In addition to the BTS class identifier, cell selection can be based on other quality of service factors, such as signal strength, signal quality, data rate, the number of connected telecommunication device, and other factors that affect quality of service. The BTS class identifier can provide information identifying a geographic coverage area and additional information related to the infrastructure equipment 310.

In idle mode, the telecommunication device can select or prioritize infrastructure equipment in order to establish (or re-establish) a communication channel. The telecommunication device 200 can use a mobility management algorithm to determine cell selection when positioned in the coverage areas 320 of two or more infrastructure equipment 310. In this instance, the telecommunication device 200A has the option to select infrastructure equipment 310A or infrastructure equipment 310B. The telecommunication device 200B can select infrastructure equipment 310A. Illustratively, mobility management algorithm processes a number of factors or criteria for cell selection, including BTS class. Other factors can include signal strength, signal quality, data rate, number of connected users, and other parameters that are used to determine the quality of service.

With continued reference to FIG. 3, the coverage area 320A may be considered larger than the coverage area 320B. Accordingly, in one embodiment, infrastructure equipment 310A and 310B are associated with different BTS class identifiers based, at least in part, on differences in coverage areas. For example 310A could have a BTS class identifier associated with a macro-cell. Infrastructure equipment 310B could have a BTS class identifier associated with a microcell. Each infrastructure equipment can send the BTS class identifier to the telecommunication device 200. For example, BTS class identifier information may be transmitted with other information, such as in a control message transmitted from the infrastructure equipment. The telecommunication device obtains the BTS class information and utilizes a mobility management algorithm to select or prioritize infrastructure equipment.

Figure 4A:
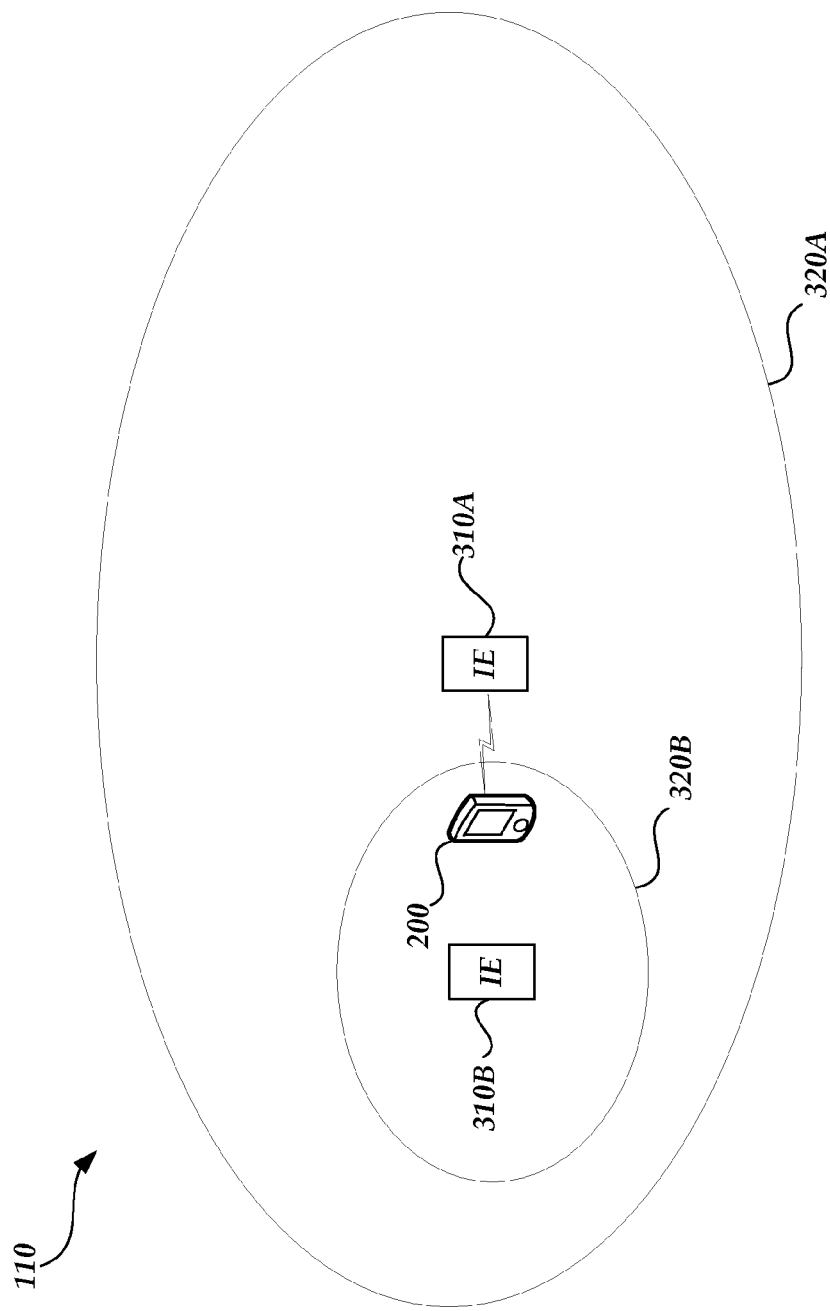
FIG. 4A is an illustrative diagram depicting telecommunication device in communication with a base station in an illustrative telecommunications environment.
Figure 4B:
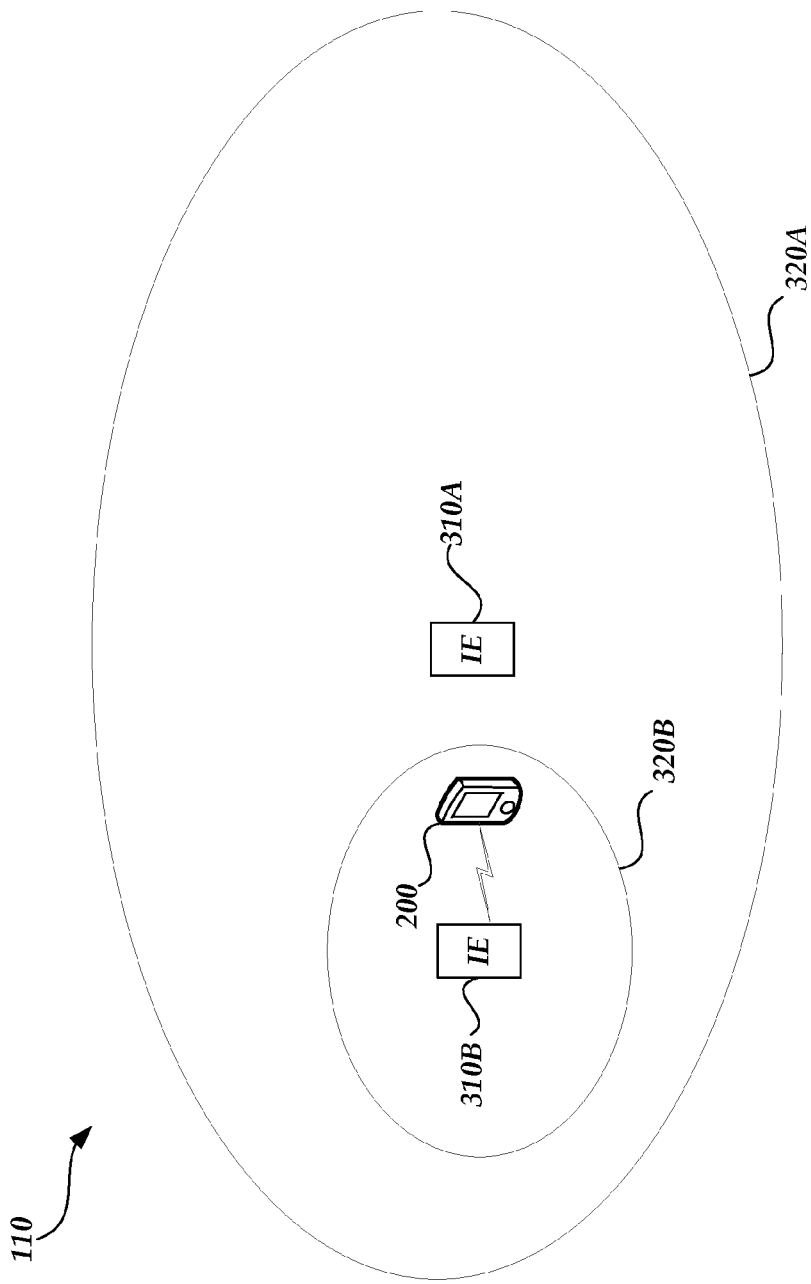
FIG. 4B is an illustrative diagram depicting telecommunication device in communication with a base station in an illustrative telecommunications environment.

FIG. 4A and FIG. 4B illustrate the wireless communication network 110 with a telecommunication device 200 positioned in overlapping coverage areas 320A and 320B. In idle mode, the telecommunication device 200 is primarily responsible for cell selection or prioritization. The mobility management module in the telecommunication device 200 can be used to execute one or more mobility management algorithms. In the instance illustrated in FIG. 4A, the telecommunication device 200 has selected the infrastructure equipment 310A based on execution of a mobility management algorithm. In the instance illustrated in FIG. 4B the telecommunication device 200 has selected the infrastructure equipment 310A based on execution of a mobility management algorithm. Illustratively, mobility management algorithms can determine cell selection based, at least in part, on the BTS class identifier information.

For simplicity, assume that the operational characteristics of infrastructure equipment 310A and 310B are the same in the separate embodiments illustrated in FIGS. 4A and 4B. Based on differences in how a representative mobility management algorithm processes BTS class identifier information (among other information), the telecommunication device selects infrastructure equipment 310A in FIG. 4A and selects infrastructure equipment 310B in FIG. 4B.

As previously indicated, the mobility management algorithms can associate one or more BTS class identifiers with weighted values. The weighted values can influence the selection of infrastructure equipment associated with different BTS class identifiers by either increasing or decreasing the likelihood that the infrastructure equipment will be selected. In FIG. 4A, assume that the weight assigned by the mobility management algorithm for BTS class identifier associated with the larger cell 310A is weighted more heavily than the BTS class identifier associated with the smaller cell 310A. In contrast, and as illustrated in FIG. 4B, assume that the weight assigned by the mobility management algorithm for the BTS class identifier associated with the smaller cell 310B is weighted more heavily for the BTS class identifier for the larger cell 310A. In some instances, the telecommunication device 200 may select the infrastructure equipment associated with a BTS class identifier having a lower weighted due to other cell selection criteria, such as quality of service.

The weight associated with a BTS class identifier can be initially determined by a service provider. In some embodiments, the service provider can provide default settings that are provided to the telecommunication device 200. The weight associated with each BTS class identifier may also be influenced by a user's preferences. For example, a user may set preferences that cause the weights associated with specific BTS identifiers to be adjusted. In some embodiments, the weights associated with the BTS class identifiers can be adjusted based on operational parameters of the telecommunication device, such as movement speed, user location, or other operational parameter. For example, if a telecommunication device is moving at a rapid speed, the weighted values associated with smaller cells may decrease and the weighted values associated with larger cells may increase. In some embodiments, the telecommunication device may adjust weights associated with the BTS class identifiers based on predefined geographic positions such as "home," "work," or other location. In such instances the telecommunication device may increase the weighted values associated with smaller cells.

Figure 5:
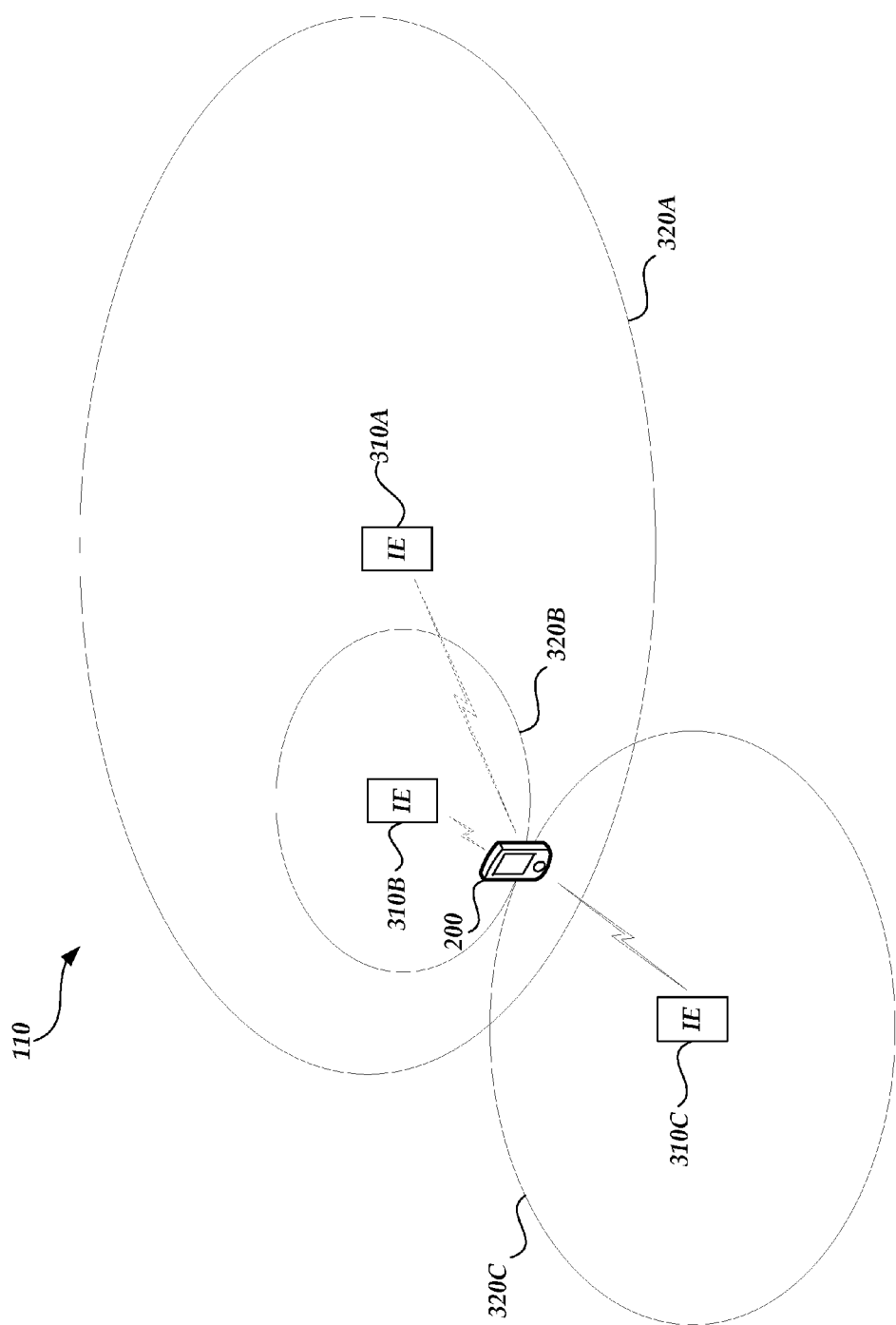
FIG. 5 is an illustrative diagram depicting handover between telecommunication device and a base station in an illustrative telecommunications environment.

FIG. 5 illustrates an example of a handover routine of telecommunication device 200 from a source infrastructure equipment 310C to a target infrastructure equipment 310A or 310B. In this embodiment, telecommunication device 200 is connected to infrastructure equipment 310C having a coverage area 320C. The telecommunication device 200 is moving from coverage area 320C into coverage areas 320B and 320A. The handover routine can transfer ongoing communication, such as an ongoing call or data session, from a source infrastructure equipment 310C to a target infrastructure equipment 310A or 310B. In the handover operation the mobility management service of the service provider can select or prioritize selection of the target infrastructure equipment. The mobility management service can use one or more mobility management algorithms to select or prioritize selection of an infrastructure equipment for handover. In this instance, the source infrastructure equipment 310C will hand over its communications to either target infrastructure equipment 310A or 310B. The mobility management service can select the infrastructure equipment 310A or 310B, based at least in part, on the BTS class information associated with the infrastructure equipment. The BTS class information can be provided by a BTS class identifier associated with each infrastructure equipment 310. Each BTS class identifier can have an associated weighted value. The weighted value associated with each BTS class identifier can be provided by the service provider.

The BTS class identifier can be one of a plurality of handover criteria used by the mobility management algorithm(s) to determine handover from one infrastructure equipment to another. In addition to BTS class identifiers, the mobility management algorithm can also consider other quality of service criteria such as signal strength, signal quality, and the number of connected.

The weighted values associated the BTS class identifiers can be used to create a bias for specific classes of cells, or a general bias for smaller or larger cells. For example, assuming, for simplicity, that other handover criteria are equal, if the weighted value associated with BTS class identifiers was weighted more heavily for smaller cells, such as infrastructure equipment 310B, then the infrastructure equipment 310C would handover communication to infrastructure equipment 310B. However, if the weighted values of the BTS class identifiers were weighted more heavily for a larger BTS class, such as infrastructure equipment 310A, then infrastructure equipment 310C would handover communication to infrastructure equipment 310A.

Figure 6:
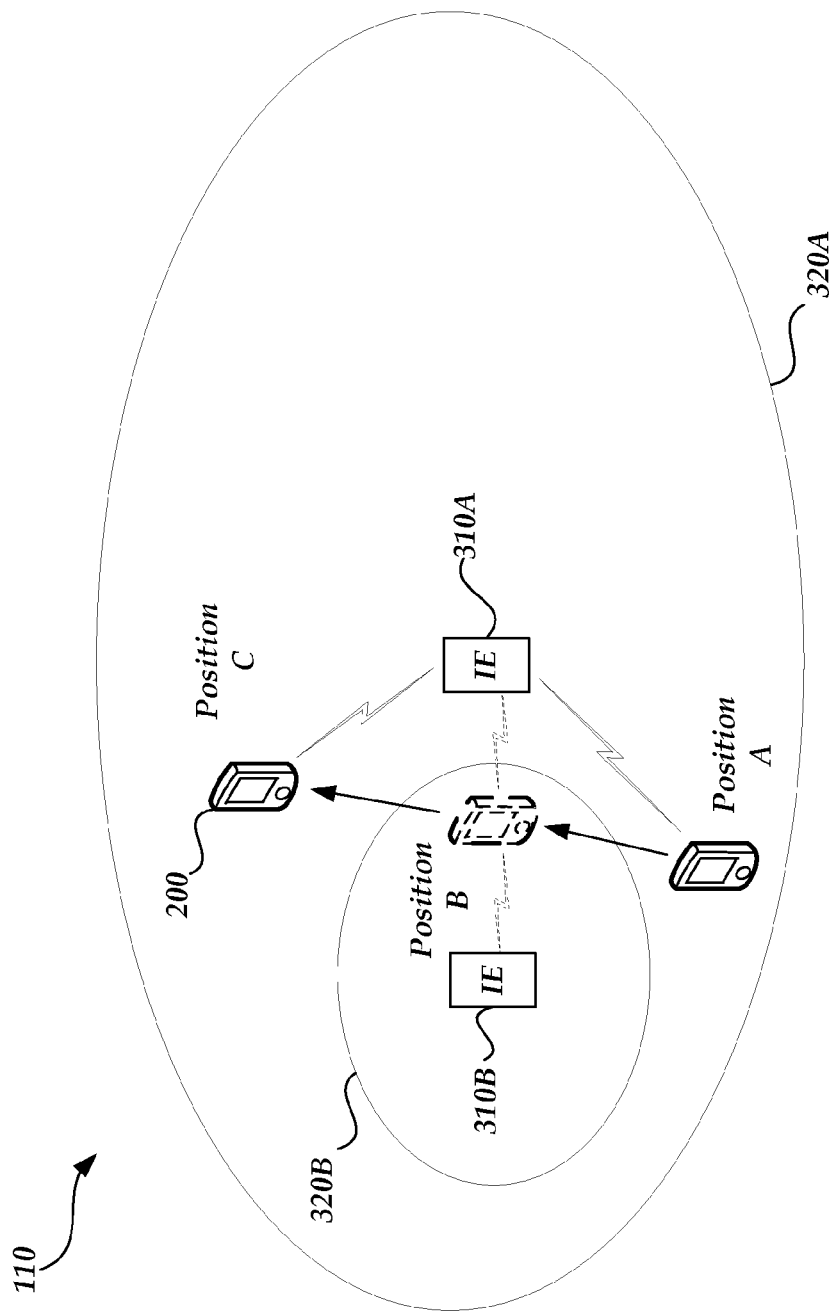
FIG. 6 is an illustrative diagram depicting movement of telecommunication device in an illustrative telecommunications environment.

FIG. 6 is an illustrative diagram depicting movement of telecommunication device 200 in an illustrative wireless communications network. The mobility management algorithm can use movement information or data, such as movement speed of the telecommunication device 200, to select or prioritize an infrastructure equipment in an idle mode selection routine and during a handover routine. The mobility management module 212 on the telecommunication device 200 can perform one or more mobility algorithms in an idle mode routine. In the handover routine the mobility management algorithm(s) can be performed by the mobility management service 140. In some embodiments the mobility management algorithm can use movement data to determine a velocity vector. In some embodiments, the movement data is GPS data. The GPS data can be used to calculate an approximate movement speed.

In this instance the telecommunication device 200 is moving from Position A to Position C, with a transitory Position B. Position B represents that transitory position of the telecommunication device 200 when it is positioned in overlapping coverage areas 320A and 320B. In Position A the telecommunication device 200 is only in coverage area 320A and in Position C the telecommunication device 200 is only in coverage area 320A. The mobility management algorithm can utilize the BTS class identifier and movement data from the telecommunication device 200 for selection of the infrastructure equipment 310. For example if the telecommunication device 200 is moving from position A to position C, the mobility management algorithm could use movement speed as a criteria for idle mode selection and handover routines.

The BTS class identifiers can be used by the mobility management algorithm to determine the approximate geographic coverage area associated with the infrastructure equipment. For example, infrastructure equipment 310B has a smaller geographic coverage area 320B and would have a different BTS class than infrastructure equipment 310A that has a larger coverage area 320A. Movement speed can be used to help reduce unnecessary switching between infrastructure equipment when the telecommunication device is passing through the coverage areas of smaller infrastructure equipment. Generally, there is an inverse correlation between the movement speed and the size of the cell. As the movement speed increases the telecommunication device will be less likely to transition from a larger cell to a smaller cell. In some embodiments, the weighted value associated with a BTS class identifier can be dynamically adjusted based on the movement speed of the telecommunication device 200. In some embodiments, thresholds can be used to adjust the weighed values of the BTS class identifiers based on the movement speed of the telecommunication device 200. For example, the threshold could be a movement speed of 50 miles per hour. In accordance with this example, if the telecommunication device is moving at 50 miles per hour from Position A to Position C, the weighted value of the BTS class identifier associated with 310A would be increased and the weighted value of the BTS class identifier associated with 310B would be decreased.

In some embodiments, the movement data can be used as an initial determination, such as a threshold, to determine whether or not to consider a handover request from another target infrastructure equipment. Generally, the movement speed of the telecommunication device can be used as an initial threshold to determine whether the telecommunication device 200 would switch from a larger infrastructure equipment to a smaller infrastructure equipment. For example, if a telecommunication device is moving at a speed greater than a threshold speed then the telecommunication device will not transition to certain categories of BTS classes, such as, for example, a pico-cell or smaller. The mobility management algorithm can utilize one or more thresholds.

In another embodiment the mobility management algorithm can calculate a velocity vector based on the movement data of the telecommunication device 200. The velocity vector can have a direction and a magnitude that can be used to predict movement of the telecommunication device 200. The mobility management algorithm can use the velocity vector to predict the amount of time that a telecommunication device 200 would be located in overlapping coverage areas. For example, a velocity vector could be used to predict the amount of time that the telecommunication device 200 would be located in overlapping coverage areas 320A and 320B and adjust the weighted values associated with the infrastructure equipment 310A and 310B accordingly. In one embodiment the mobility management algorithm could use a threshold to determine whether the telecommunication device 200 would spend a sufficient amount of time within overlapping coverage areas before processing the idle mode selection or handover routines.

The algorithms associated with handover and idle mode routines can be different and can depend on multiple factors that are not the same. As such, the weighted values associated with handover routines can be different than the weighted values associated with idle mode routines. In some embodiments, movement data can be an additional factor in the mobility management algorithm. In some embodiments, the movement data can be used to adjust the weighted values associated with each BTS class identifier.

Figure 7:
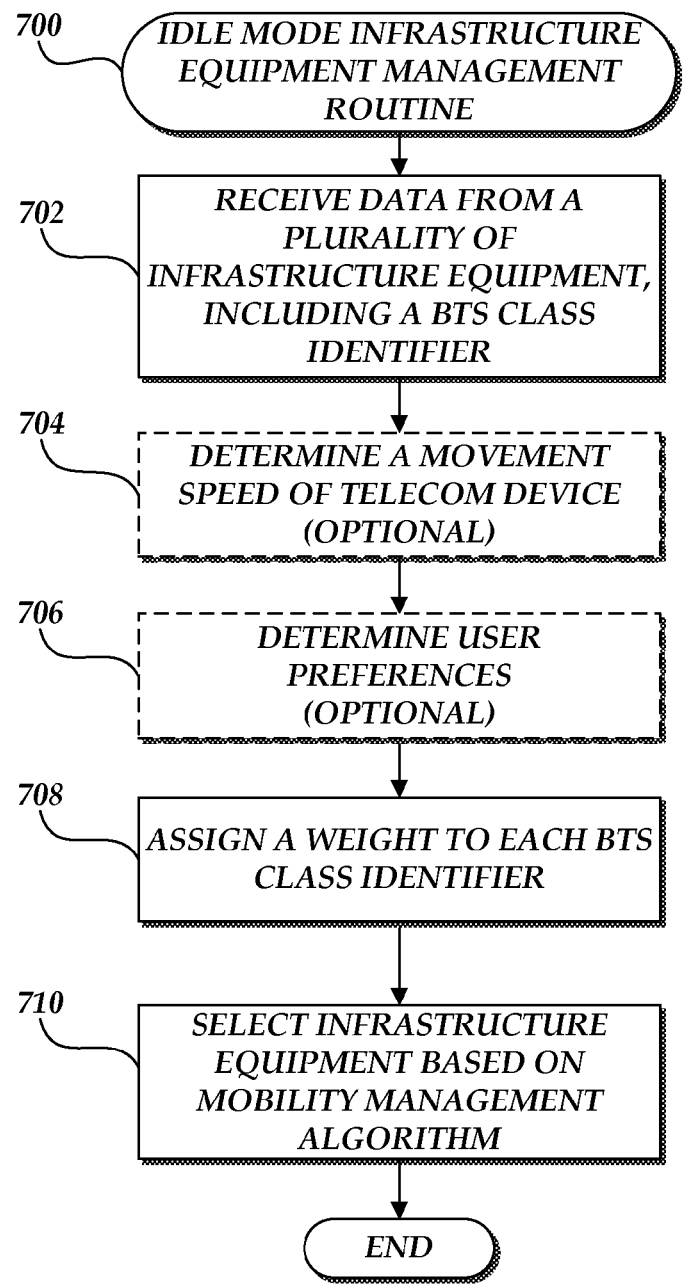
FIG. 7 is a flow diagram depicting an illustrative idle mode infrastructure equipment management routine.

FIG. 7 is an embodiment of a flow chart for an idle mode infrastructure management routine 700. Illustratively, the routine 700 can be performed by the mobility management module 212 on the telecommunication device 200. The routine 700 can be used to determine the selection of infrastructure equipment in idle mode by a telecommunication device 700.

At block 702 the telecommunication device receives data from a plurality of infrastructure equipment, including a BTS class identifier associated with each infrastructure equipment. The BTS class identifier can include one or more characteristics about the infrastructure equipment. For example the BTS class identifier can identify the BTS class associated with the infrastructure equipment. In some embodiments the BTS class identifier can provide additional characteristics, such as a data rate associated with the infrastructure equipment. The data received from the infrastructure equipment can also include operational characteristics such as power level, bit rate, signal quality, signal strength, number of connected telecommunication devices, and other operational characteristics.

At block 704, the mobility management module can, optionally, utilize movement data associated with the telecommunication device, such as a movement speed. The movement speed of the telecommunication device can be determined using movement data, such as GPS data and/or an accelerometer data. In some embodiments the mobility management module can also predict movement based on the movement data. For example, in one embodiment the mobility management module can calculate a velocity vector having a movement speed and a direction.

At block 706 the mobility management module can, optionally, consider user preferences stored on the telecommunication device. The user preferences can include settings or preferences, such as preferences for a BTS class, data rates, and/or connection types. For example a user may have user preferences to bias toward larger or smaller infrastructure equipment, or bias towards a BTS class with higher data rates.

At block 708 the mobility management module utilizes a weighted value associated with each BTS class identifier. The weighted values associated with each BTS class identifier can be determined by the service provider, data stored in the telecommunication device, or other source for determining the initial basis for each weighted value. The weighted values of the BTS class identifiers can be used to create a bias for specific classes of cells, or a general bias for smaller or larger cells. The weighted values can be based on cost, data rates, network traffic, user subscription plans, or other criteria. In some embodiments, the weighted values associated with each BTS class identifier can be updated periodically by the service provider. In some embodiments, the infrastructure equipment can be ranked according to the BTS class.

In some embodiments, movement data associated with the telecommunication device can be used to adjust the weights assigned to each BTS class identifier. In some embodiments, the mobility management algorithm(s) can take movement data into account without adjusting the weights associated with the BTS class identifiers.

In some embodiments, the user preferences can be used to adjust or modify the weights associated with each BTS class identifier. In one embodiment the weighted values associated with the BTS class identifiers are modified based on the user preferences. In another embodiment the user preferences can provide another criterion that the mobility management algorithm uses to select the infrastructure equipment in idle mode. In some embodiments a user has no influence on the weighted values associated with the BTS class identifiers.

At block 710 the telecommunication device selects or prioritizes selection of infrastructure equipment based, at least in part, on the mobility management algorithm. The mobility management algorithm can use the weighted values associated with the BTS class identifier from each of the plurality of infrastructure equipment. The mobility management algorithm can also consider other quality of service criteria, such as signal strength and signal quality, for each infrastructure equipment. Other criteria such as movement speed of the telecommunication device and user preferences can also be considered. In some embodiments, infrastructure equipment can be removed from consideration based on a calculated movement speed of the telecommunication device. The mobility management algorithm can process the available quality of service criteria and the BTS class information to select an infrastructure equipment. In instances where the BTS class identifiers are the same, the mobility management algorithm can rely on traditional quality of service criteria to select an infrastructure equipment.

Depending on the implementation, the routine 700 can be implemented to occur continuously, periodically, and/or based on the occurrence of specific events, such as movement. In some embodiments, after an initial selection, the source infrastructure equipment have an additional bias or weighted value associated with it to help reduce unnecessary transitions from one infrastructure equipment to another.

Figure 8:
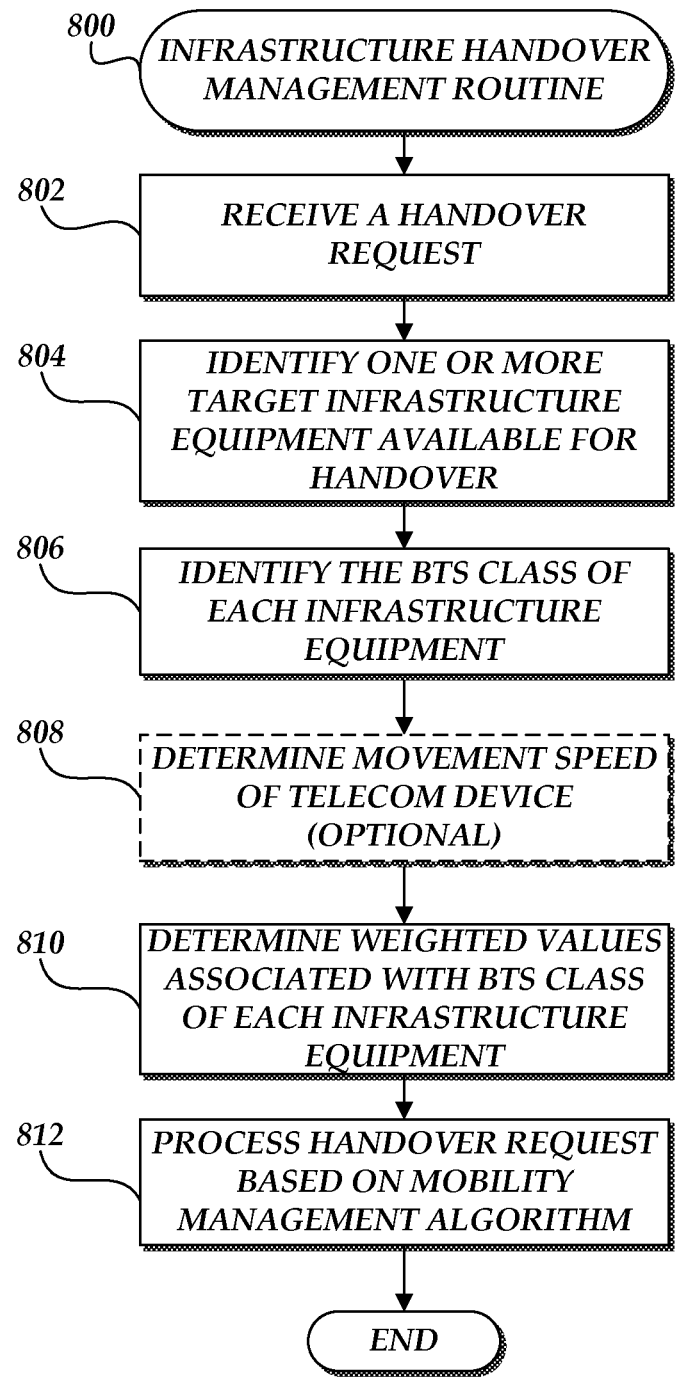
FIG. 8 is a flow diagram depicting an illustrative infrastructure handover management routine.

FIG. 8 is an embodiment of a flow chart for an infrastructure handover management routine 800. Illustratively, the routine 800 can be performed by the mobility management service 140. The handover management routine can determine whether to transfer an active communication channel, such as an ongoing call or data session, from a source infrastructure equipment to a target infrastructure equipment.

At block 802, a request for handover relating to a telecommunication device is received. The handover may be requested by the telecommunication device, by the source infrastructure equipment, or by a neighboring infrastructure equipment.

At block 804, one or more target infrastructure equipment are identified that are available for handover. The available infrastructure equipment can be identified by geographic position of the telecommunication device and its relation the coverage areas of the one or more target infrastructure equipment.

At block 806, the BTS class of each infrastructure equipment, source and target, is identified. The BTS class is associated, at least in part, with a coverage area of the infrastructure equipment. The BTS class of the infrastructure equipment can be provided by a BTS class identifier. The BTS class identifier can include one or more characteristics about the infrastructure equipment. For example, each BTS class identifier can identify a BTS class associated with the infrastructure equipment and, in some embodiments, provide additional operational characteristics, such as a data rate associated with the infrastructure equipment, power level, bit rate, signal quality, signal strength, number of connected telecommunication device, and other operational characteristics.

At block 808, the mobility management service can, optionally, utilize movement data associated with the telecommunication device. A movement speed of the telecommunication device can be determined using movement data, such as GPS data and/or an accelerometer data. In some embodiments the mobility management service or telecommunication device can predict movement based on the movement data. For example, in one embodiment the mobility management service or telecommunication device can calculate a velocity vector having a movement speed and a direction.

At block 810, the mobility management service determines a weighted value associated with each BTS class identifier. The weighted value assigned to each BTS class identifier can be determined by the service provider, data stored in the telecommunication device, or other source for determining the initial basis for each weighted value. The weighted value assigned to each BTS class identifier can be based, at least in part, on the geographic size associated with the BTS class. The weighted values of the BTS class identifiers can be used to create a bias for specific classes of cells, or a general bias for smaller or larger cells. The weighted values can be based on cost, data rates, network traffic, user subscription plans, or other criteria. In some embodiments, the weighted values associated with each BTS class identifier can be updated periodically by the service provider. Based on the BTS class identifiers provided by each infrastructure equipment, the mobility management service can determine the weighted values associated with each infrastructure equipment. In some embodiments, the infrastructure equipment can be ranked according to the BTS class.

In some embodiments, the movement speed can then be used to adjust the weights assigned to each BTS class identifier. In some embodiments, movement data can be an additional factor in the mobility management algorithm. In some embodiments, the movement data can be used to adjust the weighted values associated with each BTS class identifier. In some embodiments, the movement data can be used to as an initial determination, such as a threshold, to determine whether or not to consider a handover request from a target infrastructure equipment.

At block 812, the mobility management service processes the handover request based on the mobility management algorithm. The request is processed based, at least in part, on the weighted values associated the BTS class identifier from each of the plurality of infrastructure equipment. In addition to the weighted values associated with the BTS class identifier, the mobility management algorithm can consider other quality of service criteria, such as signal strength and signal quality, for each infrastructure equipment. Other criteria such as movement speed of the telecommunication device and user preferences can also be considered. In some embodiments, an infrastructure equipment can be removed from consideration based on a calculated movement speed of the telecommunication device. In instances where the BTS class identifiers are the same, the mobility management service can rely on traditional quality of service criteria to select an infrastructure equipment.

In some instances, the handover request is denied and the source infrastructure equipment does not handover communication to a target infrastructure equipment. For example, a telecommunication device connected to a macro-cell, may receive a handover request from a femto-cell. The mobility management service may determine, based on the mobility management algorithm, to not handover to the femto-cell. In some instances, there is a handoff of the telecommunication device from the source infrastructure equipment to one of the target infrastructure equipment.

All of the processes described herein may be embodied in, and fully automated via, software code modules executed by one or more general purpose computers or processors, which may also run in virtual machines on one or more physical computing units. The code modules may be stored in any type of computer-readable medium or other computer storage device. Some or all the methods may alternatively be embodied in specialized computer hardware. In addition, the components referred to herein may be implemented in hardware, software, firmware or a combination thereof. As such, reference in the disclosure to actions performed by a module or component relates to the execution of executable instructions by a processing device, or devices, to cause the referenced action to be performed.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Conjunctive language such as the phrase "at least one of X, Y and Z," unless specifically stated otherwise, is to be understood with the context as used in general to convey that an item, term, etc. may be either X, Y or Z. Thus, such conjunctive language is not generally intended to imply that certain embodiments require at least one of X, at least one of Y and at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following Claims.

What is claimed is:

1. A computer-implemented method for selecting a infrastructure equipment in a wireless communication network by a telecommunication device, the method comprising:
   receiving from each of a plurality of infrastructure equipment a base transceiver station (BTS) class identifier, wherein each BTS class identifier is based, at least in part, on a geographic coverage area associated with the infrastructure equipment;
   assigning a weighted value to each of the BTS class identifiers, wherein individual weighted values bias selection of infrastructure equipment by the telecommunication device;
   determining a movement speed of the telecommunication device;
   based on a determination that the movement speed of the telecommunication device exceeds a movement speed threshold, adjusting the weighted values of the BTS class identifiers based, at least in part, on the movement speed of the telecommunications device; and
   selecting a target infrastructure equipment of the plurality of infrastructure equipment based, at least in part, on the adjusted weighted values associated with the BTS class identifiers of the plurality of infrastructure equipment.

2. The computer-implemented method of claim 1 further comprising determining a quality of service criterion associated with each of the plurality of infrastructure equipment.

3. The computer-implemented method of claim 2, wherein selecting the target infrastructure equipment is based, at least in part, on the quality of service criterion associated with each of the plurality of infrastructure equipment.

4. The computer-implemented method of claim 2, wherein selecting the target infrastructure equipment includes using quality of service criteria to select the target infrastructure equipment when the BTS Class identifiers of the plurality of infrastructure equipment are the same.

5. The computer-implemented method of claim 1, wherein the weighted value of the BTS class identifier associated with a smaller geographic area is greater than the weighted value of the BTS class identifier associated with a larger geographic area.

6. The computer-implemented method of claim 1 further comprising ranking each of the plurality of infrastructure equipment according to the BTS class identifier.

7. The computer-implemented method of claim 1, wherein the base transceiver station class identifier comprises a first identifier and a second identifier, wherein each of the first identifier and the second identifier are associated with an infrastructure equipment characteristic.

8. The computer-implemented method of claim 7, wherein each infrastructure equipment characteristic comprises one of geographic class, power, data rate, number of connected users, or infrastructure equipment power level.

9. The computer-implemented method of claim 1, wherein the movement speed is based, at least in part, on location data.

10. The computer-implemented method of claim 1, wherein selecting the target infrastructure equipment is based, at least in part, on the movement speed of the telecommunication device.

11. The computer-implemented method of claim 1, wherein assigning the weighted values to each base transceiver station class identifiers is based, at least in part based, on preferences from the telecommunication device.

12. The computer-implemented method of claim 1 further comprising determining a velocity vector of the telecommunication device.

13. The computer-implemented method of claim 12, wherein the velocity vector is based, at least in part, on location data.

14. The computer-implemented method of claim 12 further comprising predicting movement of the telecommunication device based, at least in part, on the velocity vector.

15. The computer-implemented method of claim 14, wherein the selecting a target infrastructure equipment is based, at least in part, on the predicted movement of the telecommunication device.

16. A non-transitory computer readable medium having a computer-executable component for selecting a infrastructure equipment in a wireless communication network by a telecommunication device, the computer-executable component comprising:
   a mobility management module operative to:
      receive from each of a plurality of infrastructure equipment a base transceiver station class identifier, wherein each base transceiver station class identifier is based, at least in part, on a geographic coverage area associated with the infrastructure equipment;
      assign a weighted value to each of the base transceiver station class identifiers, wherein individual weighted values are configured to bias selection of infrastructure equipment by the telecommunication device;
      based on a determination that a movement speed of the telecommunication device exceeds a movement speed threshold, adjust the weighted values of the BTS class identifiers based, at least in part, on the movement speed of the telecommunications device; and
      select a target infrastructure equipment of the plurality of infrastructure equipment based, at least in part, on the adjusted weighted values associated with the base transceiver station class identifiers of the plurality of infrastructure equipment.

17. The computer-readable medium of claim 16, wherein the mobility management module is further configured to determine quality of service criteria associated with each of the plurality of infrastructure equipment.

18. The computer-readable medium of claim 17, wherein the mobility management module is further configured to select the target infrastructure equipment based, at least in part, on the quality of service criteria.

19. The computer-readable medium of claim 16, wherein the weighted value of a base transceiver station class identifier associated with a smaller geographic area is greater than the weighted value of a base transceiver station class identifier associated with a larger geographic area.

20. The computer-readable medium of claim 16, wherein the base transceiver station class identifier comprises a first identifier and a second identifier, wherein each identifier is associated with an infrastructure equipment characteristic.

21. The computer-readable medium of claim 20, wherein each infrastructure equipment characteristic comprises one of geographic size, data rate, number of connected users, or infrastructure equipment power level.

22. The computer-readable medium of claim 16, wherein the movement speed is based, at least in part, on location data.

23. The computer-readable medium of claim 16, wherein the mobility management module is further configured to select the target infrastructure equipment based, at least in part, on the movement speed of the telecommunication device.

24. The computer-readable medium of claim 16, wherein the mobility management module is further configured to assign weighted values associated with the base transceiver station class identifiers based, at least in part based, on preferences from the telecommunication device.

25. A telecommunication device for selecting a infrastructure equipment in a wireless communication network, the telecommunication device comprising:
   a data store; and
   a processor in communication with a data store, the processor operative to execute instructions stored on the data store to execute a mobility management component, the mobility management component operative to:
      receive from each of a plurality of infrastructure equipment a base transceiver station (BTS) class identifier, wherein each BTS class identifier is based, at least in part, on a geographic coverage area associated with the infrastructure equipment;
      assign a weighted value to each of the BTS class identifiers, wherein individual weighted values are configured to bias selection of infrastructure equipment by the telecommunication device;
      determine a movement speed of the telecommunication device;
      based on a determination that the movement speed of the telecommunication device exceeds a movement speed threshold, adjust the weighted values of the BTS class identifiers; and
      select a target infrastructure equipment of the plurality of infrastructure equipment based, at least in part, on the adjusted weighted values associated with the BTS class identifiers of the plurality of infrastructure equipment.

26. The system of claim 25, wherein the mobility management module is further configured to determine quality of service criteria associated with each of the plurality of infrastructure equipment.

27. The system of claim 26, wherein the mobility management module is further configured to select the target infrastructure equipment based, at least in part, on the quality of service criteria.

28. The system of claim 25, wherein the weighted value of the BTS class identifier associated with a smaller geographic area is greater than the weighted value of a BTS class identifier associated with a larger geographic area.

29. The system of claim 25, wherein the BTS class identifier comprises a first identifier and a second identifier, wherein each identifier is associated with an infrastructure equipment characteristic.

30. The system of claim 29, wherein each infrastructure equipment characteristic comprises one of geographic size, data rate, number of connected users, or infrastructure equipment power level.

31. The system of claim 25, wherein the movement speed is based, at least in part, on location data.

32. The system of claim 25, wherein the mobility management module is further configured to select the target infrastructure equipment based, at least in part, on the movement speed of the telecommunication device.

33. The system of claim 25, wherein the mobility management module is further configured to assign weighted values associated with the BTS class identifiers based, at least in part based, on preferences from the telecommunication device.

* * * * *